Figure 1:
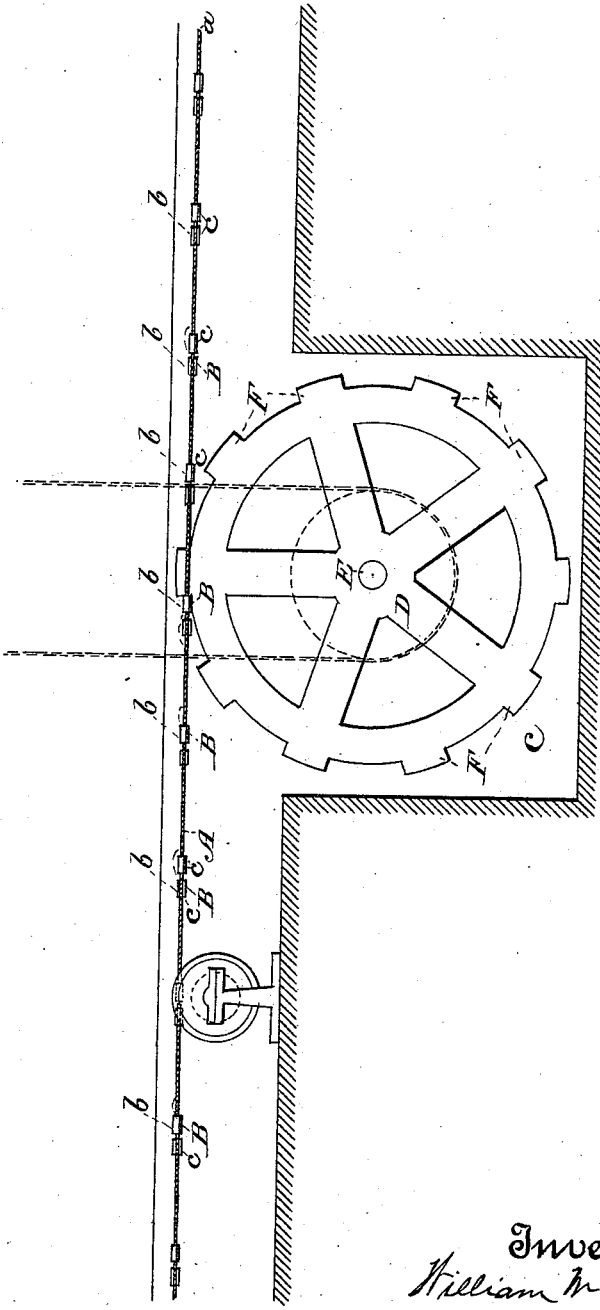

(No Model.)

W. McCALL & J. V. DE VRY.

DEVICE FOR TRANSMITTING POWER FROM A CENTRAL STATION.

No. 292,025. Patented Jan. 15, 1884.

Witnesses:
Geo. H. Strong.
J. H. Towne

Inventors,
William McCall
J. V. De Vry
By Dewey & Co.
Attorneys

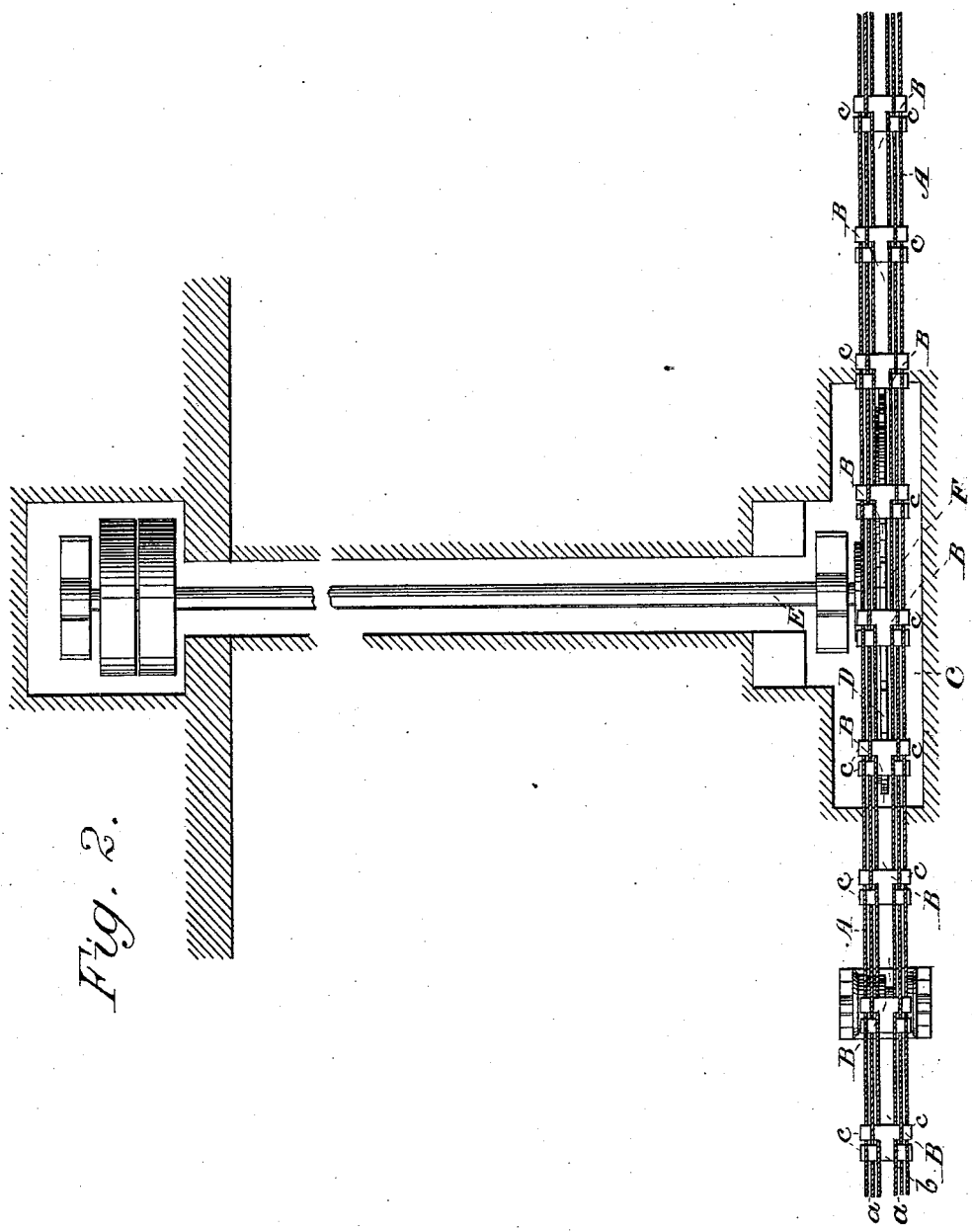

UNITED STATES PATENT OFFICE.

WILLIAM McCALL AND J. VITAL DE VRY, OF SAN FRANCISCO, CALIFORNIA.

DEVICE FOR TRANSMITTING POWER FROM A CENTRAL STATION.

SPECIFICATION forming part of Letters Patent No. 292,025, dated January 15, 1884.

Application filed October 15, 1883. (No model.)

*To all whom it may concern:*

Be it known that we, WILLIAM McCALL and JOHN V. DE VRY, of the city and county of San Francisco, and State of California, have invented an Improvement in Transmitting power from a Central Station; and we hereby declare the following to be a full, clear, and exact description thereof.

Our invention relates to a means for transmitting power from a central or distant source; and it consists of a flat traveling endless cable having openings or eyes formed in it at regular distances apart. This cable is driven by fixed machinery at some point, and travels over pulleys which lead it to the points where the power is desired. Shafts extend from the buildings where the power is to be used, and have toothed wheels fixed to their outer ends, the teeth engaging the slots or openings in the cable, so as to be driven by it, as will be more fully explained by reference to the accompanying drawings, in which—

Figure 1 is a side elevation, in section, of a portion of a street cable-railway, showing a shaft and pulley for taking off the power. Fig. 2 is a plan view.

Our present invention is applicable where street cable-railways are laid, the power being taken directly from the endless traveling cable which propels the cars; or the cable may be laid specially for the sole purpose of transmitting power.

Our cable A is made flat and of some considerable width, and has openings or eyes B formed in it at equal distances apart. The cable may be formed in various ways, with openings or eyes at intervals; but we have found that a very satisfactory cable can be made by employing small ropes or strands *a a*, which lie side by side, the number being sufficient to make the required width. These ropes are arranged in two groups, having a space between them in the center of the cable. At intervals along the cable, plates *b* are fixed, having arms *c* projecting from their sides, and the ropes *a* are interwoven with these arms, so as to hold them rigidly in place, and at the same time the plates hold the two groups of ropes apart, so as to form the central openings or slots, into which the teeth of the wheel to be driven will project. This cable may be run at an elevation above the ground, or it may travel in an underground tube or tunnel, as in the case of cable-railways, and is driven by a stationary engine or motor situated at some convenient central point. At any point where it is desired to transmit power from the cable, if the latter runs in an underground tube or tunnel, a pit, C, is formed of sufficient depth to receive a wheel, D, which is keyed to the end of a shaft, E. The wheel D has teeth or projections F upon its periphery, so formed as to fit into the openings or eyes in the cable, and as the cable passes over this wheel, which projects into the cable tube or tunnel sufficiently for the purpose, it causes it to revolve, and thus turns the shaft E. The cable, passing horizontally over the toothed wheel, which stands in a vertical plane, engages with its teeth by gravitation or by the tension of the cable, which passes tangent to the rim of the wheel without being bent or deflected out of its course; and this saves the cable from the serious deterioration which would be caused by the constant bending and straightening that occur when a cable passes partly or wholly around a pulley or drum. The shaft extends horizontally into the lower part of the building in which power is to be applied, and is in the proper position to receive pulleys, from which belts may lead directly without the intervention of any mechanism for change of direction. By this construction of the cable and the wheel to which power is applied there will be no slip, and the whole power of the cable may be transmitted with the least amount of friction.

Having thus described our invention, what we claim as new, and desire to secure by Letters Patent, is—

1. In an apparatus for driving stationary machinery by means of an endless traveling belt composed of wire ropes or strands, the central plates having side arms through which the ropes are interwoven at regular intervals, in combination with a wheel mounted upon a shaft, and having projections or teeth adapted to engage with the belt, whereby motion is imparted, substantially as set forth, and for the purposes described.

2. An endless traveling belt composed of wire ropes or strands arranged in groups upon each side of a central opening, in combination with central plates having side arms through which the ropes are interwoven at regular intervals, substantially as herein described.

In witness whereof we have hereunto set our hands.

WILLIAM McCALL.
J. VITAL DE VRY.

Witnesses:
S. H. NOURSE,
H. C. LEE.